United States Patent [19]
Frutiger et al.

[11] Patent Number: 5,786,993
[45] Date of Patent: Jul. 28, 1998

[54] APPARATUS FOR AND METHOD OF CONTROLLING AND/OR REGULATING PROCESS PARAMETERS OF AN INSTALLATION

[75] Inventors: Theo Frutiger, Steinhausen; Jim Coogan, Des Plaines; Walter Hegetschweiler, Steinhausen; Franz Renggli, Buchrain, all of Switzerland

[73] Assignee: Landis & Gyr Technology Innovation Corp., Switzerland

[21] Appl. No.: 707,242

[22] Filed: Sep. 3, 1996

[30] Foreign Application Priority Data

Jun. 14, 1996 [CH] Switzerland ............... 1493/96

[51] Int. Cl.$^6$ ............... G05B 11/01
[52] U.S. Cl. ............... 364/140; 364/188; 364/468.09; 395/12
[58] Field of Search ............... 364/130, 140, 364/141, 146, 147, 188, 189, 468.09; 395/12, 51, 61, 200.53, 903, 904, 906, 907, 911, 912

[56] References Cited

U.S. PATENT DOCUMENTS

| | | | |
|---|---|---|---|
| 4,628,435 | 12/1986 | Tashiro et al. | 364/468.09 |
| 5,063,523 | 11/1991 | Vrenjak | 395/200.53 |
| 5,204,939 | 4/1993 | Yamazaki et al. | 395/51 |
| 5,400,246 | 3/1995 | Wilson et al. | 364/146 |

FOREIGN PATENT DOCUMENTS 0694825 1/1996 European Pat. Off. ........ G05B 17/02

OTHER PUBLICATIONS

Landis & Gyr, PC-Software "Insight 4.XX," description CM2N8522D, Nov. 1993.

Yasuo Fujii et al., "On-Line Expert System for Power Distribution System Control," Electrical Power & Energy System, vol. 14, No. 1, Feb. 1992.

Derek J. Hatley and Imtiaz A. Pirbhai, "Strategies for Real-Time System Specification," Dorset House Publishing, New York, New York, 1934, pp. 76–78.

*Primary Examiner*—Paul P. Gordon
*Assistant Examiner*—Steven R. Garland
*Attorney, Agent, or Firm*—Greer, Burns & Crain, Ltd.

[57] ABSTRACT

An apparatus for controlling and/or regulating process parameters of an installation such as a building automation installation has at least a first decision table and preferably a second decision table. The decision tables have rules with which a priority is associated. By evaluating the rules of the first decision table, on the basis of the state of a sub-system of the installation, a further state value is ascertained and fed to an input of the second decision table. The state of a further sub-system of the installation is altered by evaluation of rules of the second decision table. The decision tables can be represented for an installation operator in a picture screen window.

9 Claims, 9 Drawing Sheets

$$
\begin{aligned}
&\text{if } expr_{11} \text{ and } expr_{12} \text{ and } expr_{13} \text{ then} \\
&\quad y_1 := x_{11}; \\
&\quad y_2 := x_{12}
\end{aligned}
\Bigg\} \; 31.1
$$

$$
\begin{aligned}
&\text{elsif } expr_{21} \text{ and } expr_{22} \text{ and } expr_{23} \text{ then} \\
&\quad y_1 := x_{21}; \\
&\quad y_2 := x_{22}
\end{aligned}
\Bigg\} \; 31.2
$$

$$
\begin{aligned}
&\text{elsif } expr_{31} \text{ and } expr_{32} \text{ and } expr_{33} \text{ then} \\
&\quad y_1 := x_{31}; \\
&\quad y_2 := x_{32}
\end{aligned}
\Bigg\} \; 31.3
$$

$$
\begin{aligned}
&\text{elsif } expr_{41} \text{ and } expr_{42} \text{ and } expr_{43} \text{ then} \\
&\quad y_1 := x_{41}; \\
&\quad y_2 := x_{42}
\end{aligned}
\Bigg\} \; 31.4
$$

$$
\begin{aligned}
&\text{else} \\
&\quad y_1 := x_{51}; \\
&\quad y_2 := x_{52} \\
&\text{end if}
\end{aligned}
\Bigg\} \; 31.5
$$

Fig.6 if (MANCMD=AUTO) and (EQSCMD=VAC) and not(FIRE) then
    MODE := Off  } 52.1 elsif (MANCMD=AUTO) and (EQSCMD=OCC) and not(FIRE) then
    MODE := Day  } 52.2 elsif (MANCMD=AUTO) and (EQSCMD=WRM) and not(FIRE) then
    MODE := Warmup  } 52.3 elsif (MANCMD=OFF) and not(FIRE) then
    MODE := Off  } 52.4 elsif (MANCMD=ON) and not(FIRE) then
    MODE := Day  } 52.5 elsif SMOKE then
    MODE := Fire  } 52.6 else
    MODE := OFF  } 52.7
end if

```
if MODE=Off then
    SAF   := OFF
    RAF   := OFF              } 60.1
    CCV   := 0
    HCV   := 0
    MXDMP := 0
elsif MODE=Day then
    SAF   := ON
    RAF   := ON
    CCV   := Y1               } 60.2
    HCV   := Y2
    MXDMP := Y3
elsif MODE=Warmup then
    SAF   := ON
    RAF   := ON
    CCV   := 0                } 60.3
    HCV   := 100
    MXDMP := 0
elsif MODE=Fire then
    SAF   := OFF
    RAF   := OFF
    CCV   := 0                } 60.4
    HCV   := 0
    MXDMP := 0
else
    SAF   := OFF
    RAF   := OFF
    CCV   := 0                } 60.5
    HCV   := 0
    MXDMP := 0
end if
```

APPARATUS FOR AND METHOD OF CONTROLLING AND/OR REGULATING PROCESS PARAMETERS OF AN INSTALLATION

BACKGROUND OF THE INVENTION

1. Field of the Invention

The invention relates to an apparatus for and a method of controlling and/or regulating process parameters of an installation.

Such apparatuses and methods are suitable for example for controlling and/or regulating process parameters in complex technical systems, in which respect reference may be made for example to heating, ventilation and air-conditioning installations, access and fire monitoring systems, or more broadly referred to as building automation installations—which are also referred to as building management systems—in which, and in particular, room conditioning parameters are influenced.

2. Description of the Prior Art

An apparatus of this kind is known (U.S. Pat. No. 5,400, 246) in which values of output channels can be generated by a control program, with values of input channels being available to the control program. The values of the output channels are generated on the basis of conditions. A condition is here a logical expression with at least one value of an input channel.

It is generally known (Derek J. Hatley et al: Strategies for Real-Time System Specification; N.Y. 1988, Dorset House; Chapter 6.1, Combinational Machines), for the description of heating, ventilation and air-conditioning installations, to introduce so-called operating modes or states which relate to the installation as a whole or to a part of the installation. Possible operating modes of a heating installation are for example "REGULATING PROGRAM OFF", "REGULATING PROGRAM ON", "ECONOMY MODE" and "FROST PROTECTION". Now however a complex installation has a plurality of sub-systems which operate in juxtaposed relationship in respect of time and each of which can alter the prevailing state of the installation or a part thereof. Examples of such sub-systems are for instance a heating regulator, a time-dependent switching program for switching a heating device on or off, an emergency ventilation program, a program for executing commands of an installation operator or a program for limiting energy load peaks. On the basis of the state of a part of the installation, control members such as for example valves or flaps are automatically actuated or parameters of other parts of the installation, for example parameters of regulating units, are altered.

If now however the sub-systems uncoordinatedly alter the prevailing state of the installation or the state of a part of the installation, conflict situations or totally undefined states may occur. Coordination of the sub-systems requires a plurality of logic decisions in the programs of the installation, in which respect consideration is also to be given to priorities as for example emergency measures in a fire situation are to be dealt with more urgently than steps for minimizing load peaks in relation to power consumption.

Means are also known (Landis & Gyr, PC-Software "Insight 4.xx", description CM2N8522D, November 1993), by which a state of a building management system can be called up and represented graphically. It is not directly evident from known illustrations however what causes produce the state or which parameters directly influence the state.

In the case of complex installations however it is often extremely difficult for the service personnel, if not even impossible, to in any way discover a prescribed reference state of the installation or a part of the installation as an algorithm for determining the reference state cannot be easily recognized.

SUMMARY OF THE INVENTION

An object of the present invention is to provide an apparatus and a method with which an installation state can be coordinated in a conflict-free manner and in a clearly recognizable fashion for an installation operator.

According to one aspect of the present invention there is provided apparatus for controlling and/or regulating process parameters of an installation, comprising:

means for the graphic representation of data, commands and images, means for the input and alteration of data, means for the storage of data, a decision table comprising a plurality of rules, which table can be stored and graphically represented in an operating view, wherein associated with a said rule is a predetermined priority which is unique in said decision table and which is established by the position of said rule in the decision table, means for evaluation of said rules, wherein the sequence observed in evaluation of the rules is determined by the priorities associated with the rules, the rule having the highest priority being evaluated first, wherein at least one of said rules includes a condition and an action which action can be executed only when said condition of the rule is fulfilled, the apparatus further comprising at least one input channel having a value which is compared by said condition to a further value, and at least one output channel having a value which is altered by said action when executed.

Another aspect of the invention provides a method of controlling and/or regulating process parameters of an installation having at least four sub-systems of which at least two sub-systems each have a respective state which can be represented by a signal generated by the sub-system and of which two further sub-systems each have a state which is variable by means of a signal supplied to the respective sub-system, the method comprising:

a first method step in which, by evaluation of rules of a first decision table on the basis of the state of at least one of said at least two sub-systems, a state value Z is ascertained, a second method step in which said state value Z ascertained in the first method step is fed to an input of a second decision table, and a third method step in which, by evaluation of rules of the second decision table, the state of at least one of said two further sub-systems is altered.

Advantageous configurations are recited in the appendant claims.

BRIEF DESCRIPTION OF THE DRAWINGS

The above objects and other objects, features and advantages of the invention will be apparent from the following detailed description of illustrative embodiments which is to be read in connection with the accompanying drawings, in which.

DESCRIPTION OF THE PREFERRED EMBODIMENTS

In the mode of representation for data flow charts, which is selected for the drawings and which is known from the literature (see in that respect for example D. J. Hatley, I. A. Pirbhai: Strategies for Real-Time System Specification, Dorset House, N.Y. 1988), a circle denotes an activity, a square denotes an adjoining system and an arrow denotes a channel for the transmission of data and/or events, the points of the arrows pointing in the substantial data flow direction. A data memory which is generally available for a plurality of activities is represented by two equal-length parallel lines. Here the term data memory denotes a device for the storage of data, which also has means for preventing conflicts in the event of access which is parallel in respect of time of a plurality of activities to the data. Subsequently for example an arrangement comprising two activities connected by a channel, is equivalent to a single activity which performs all functions of said two activities. An activity can generally be broken down into a plurality of activities which are connected by way of channels and/or data memories. Further designations used in the data flow chart literature are "terminator" for the adjoining system, "process" or "task" for the activity, "data flow" or "channel" for the channel and "pool" or "data pool" for the data memory.

An activity can be embodied as an electronic circuit or also in software terms as a process, a portion of a program or a routine, while the activity also includes the target hardware in the case of a software configuration.

Figure 1:
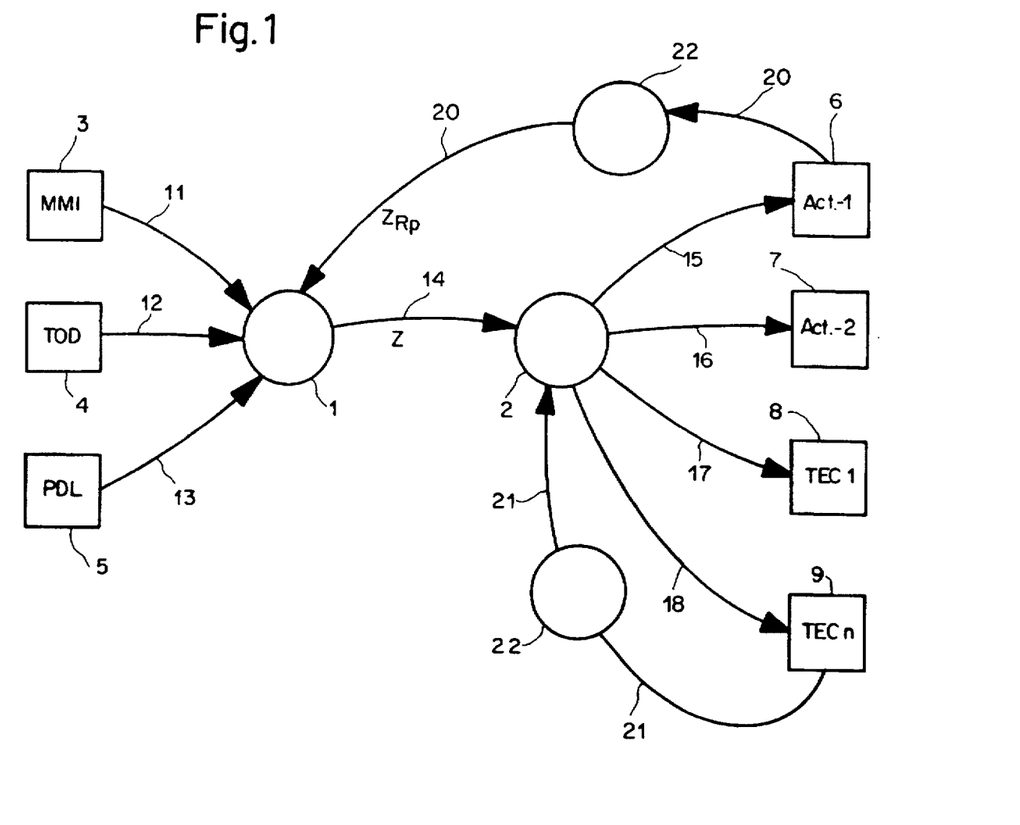
FIG. 1 shows a data flow chart of a part of an installation with two decision stages.

In FIG. 1 reference numeral 1 denotes a first decision stage and reference numeral 2 denotes a second decision stage of a part of an installation which further has a first sub-system 3, a second sub-system 4, a third sub-system 5, a fourth sub-system 6, a fifth sub-system 7, a sixth sub-system 8 and a seventh sub-system 9.

The term "sub-system" here denotes a program which is coupled to the first decision stage 1 or to the second decision stage 2 by way of a channel or also a device within the installation which is coupled to the first decision stage 1 or to the second decision stage 2 by way of a channel. For the purposes of illustrating the term "sub-system" in more concrete terms, by way of example the first sub-system 3 may be a program identified as "Man-Machine-Interface MMI" for executing commands of an installation operator, the second sub-system 4 may be a switching program for switching a heating group on and off, which program is dependent on the day of the week and the time of day and is referred to as "Time Of Day TOD", the third sub-system 5 may be a program identified as "Peak-Demand-Limiting PDL" for minimising load peaks in the consumption of energy of the installation, the fourth sub-system 6 may be a drive of a ventilation flap, identified by "Act.-1", the fifth sub-system 7 may be a mixing valve of a heating circuit, identified by "Act.-2", and the sixth sub-system 8 and also the seventh sub-system 9 may each be a respective regulating device identified by "TEC 1" and "TEC n" respectively.

The first decision stage 1 has a first input channel 11 connected to the first sub-system 3, a second input channel 12 connected to the second sub-system 4 and a third input channel 13 connected to the third sub-system 5. The two decision stages 1 and 2 are connected together by way of a channel 14, wherein the channel 14 is functionally an output channel for the first decision stage 1 and functionally an input channel for the second decision stage 2.

The second decision stage has a first output channel 15 connected to the fourth sub-system 6, a second output channel 16 connected to the fifth sub-system 7, a third output channel 17 connected to the sixth sub-system 8 and a fourth output channel 18 connected to the seventh sub-system 9.

If necessary the sub-systems 6, 7, 8 and 9 which are connected on the output side to the second decision stage 2 have a channel for feeding a signal back to the first decision stage 1 or to the second decision stage 2. Thus by way of example an output of the fourth sub-system 6 is connected by way of a feedback channel 20 to the first decision stage 1 and an output of the seventh sub-system 9 is connected for example by way of a further feedback channel 21 to the second decision stage 2. Thus the feedback channel 20 is functionally also a further input channel of the first decision stage 1 while the further feedback channel 21 is functionally also a further input channel of the second decision stage 2.

If necessary the feedback channels 20 and 21 have a delay device 22 for time-dependent influencing of a signal carried by way of the feedback channel 20 or 21 respectively.

In principle the number of input channels 11, 12, 13 and 20 of the first decision stage 1 and the number of output channels 15, 16, 17 and 18 of the second decision stage 2 are not limited.

By way of the corresponding input channels 11 or 12 or 13 respectively the sub-systems 3, 4 and 5 transmit to the first decision stage 1 a respective state $Z_p$ which obtains from their view, whereupon the first decision stage 1, on the basis of predetermined rules, ascertains a prevailing state Z and makes it available to the second decision stage 2 by way of the channel 14. In ascertaining the prevailing state Z the first decision stage 1 also takes account of a state $Z_{R_p}$ of the fourth sub-system 6 which is available by way of the feedback channel 20. The second decision stage 2 ascertains and initiates actions which are necessary, on the basis of the prevailing state Z, in the sub-systems 6, 7, 8 and 9 which are connected to the second decision stage 2, wherein the appropriate output channel 15 or 16 or 17 or 18 respectively is used to produce an action. In general the second decision stage 2, in dependence on the prevailing state Z, deals with a plurality of samples of the actuatable sub-systems 6, 7, 8 and 9.

The two decision stages 1 and 2 are advantageously each embodied by a respective decision table. The decision table permits a clear and readily viewable definition of rules by which the behaviour of the decision stage 1 or 2 respectively is determined. In addition the decision table can be illustrated in a user interface as a window of an output unit—for example as the so-called "window" on a picture screen—, whereby the information stored in the decision table is completely and clearly available as a unit in an operating view for example for an installation operator.

If necessary the second decision stage 2 uses at the input side further information which is dependent on the state Z, for pursuing a regulating strategy which is dependent on the state Z.

Figure 2:
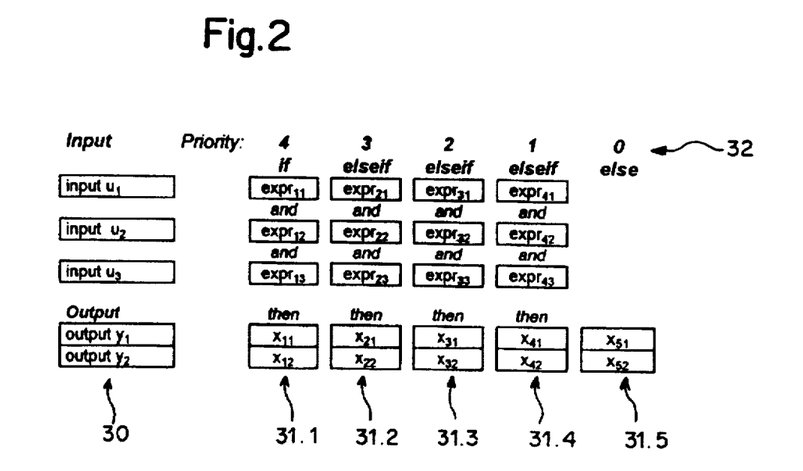
FIG. 2 shows the structure in principle of a decision table.

In FIG. 2 reference numeral 30 denotes a column of the table for entry of input channels and output channels of the decision stages 1 and 2 respectively (FIG. 1), wherein in this example which is expressed in general terms the input channels are identified by "input $u_1$", "input $u_2$" and "input $u_3$" and the output channels are denoted by "output $y_1$" and "output $y_2$". Reference numeral 31 denotes further columns in the table for the entry of rules, wherein 31.1 denotes a first rule or column in the table, 31.2 denotes a second rule or column in the table, 31.3 denotes a third rule or column, 31.4 denotes a fourth rule or column and 31.5 denotes a fifth rule or column. A rule 31.r generally includes at least one action $X_{rk}$ and, with the exception of the fifth (that is to say the last) rule 31.5, a Boolean expression. The Boolean expression in turn includes at least one sub-expression $expr_{rk}$. A plurality of sub-expressions of rule 31.r are linked together. In the index of the action $X_{rk}$ and also in the index of the sub-expression $expr_{rk}$ the letter r denotes the associated rule while the letter k in the index of the sub-expression $expr_{rk}$ specifies the input channel to which the sub-expression $expr_{rk}$ relates. In the index of the action $X_{rk}$ the letter k denotes the output channel on which the action $X_{rk}$ acts when the Boolean expression of the rule r, which is formed here by a logical AND-operation of the sub-expressions $expr_{rk}$, is true.

The sub-expression $expr_{rk}$ is a comparison of the current value of the input channel k with a further parameter of the same data type, for example with a constant. A comparison which is to be performed in the sub-expression $expr_{rk}$ is advantageously represented by the known symbol, corresponding to the comparison, of the comparison operator such as "=" for EQUAL, "<" for SMALLER, ">" for LARGER, "$\leq$" for SMALLER OR EQUAL or "$\geq$" for LARGER OR EQUAL.

If the sub-expression $expr_{12}$ reads for example "input $u_2$=ON" and if all sub-expressions $expr_{rk}$ of the decision table have the same comparison operator, then the level of clarity is increased in an operating view of the decision table insofar as the operating view illustrates only the constant "ON" which is pre-defined for a comparison with the input channel "input $u_2$". The relationship of the constant "ON", shown in the operating view, to the input channel "input $u_2$" occurs by virtue of a common line in the table; representation of the comparison operator "=" can be omitted.

Advantageously a priority which is defined by the column index r is fixedly associated with the rule 31.1 or 31.2 or 31.3 or 31.4 or 31.5 respectively. Thus the first rule 31.1, that is to say the rule with the lowest column index r, has by way of example the highest priority and the rule 31.5, that is to say that rule with the highest column index r, has the lowest priority. A mode of operation of the decision table is established with the direction of association of the priorities with respect to the column index r of the rules 31.1 and 31.2 and 31.3 and 31.4 and 31.5 respectively. Advantageously, the corresponding priority of the rule 31.1 or 31.2 or 31.3 or 31.4 or 31.5 respectively is entered in a headline 32 of the decision table.

It is self-apparent that the decision table can also be used in an alternative form of representation in which the rule 31.1 or 31.2 or 31.3 or 31.4 or 31.5 respectively is represented horizontally or in a line-wise manner, instead of vertically or in a column-wise manner as in the drawing.

Figure 3:
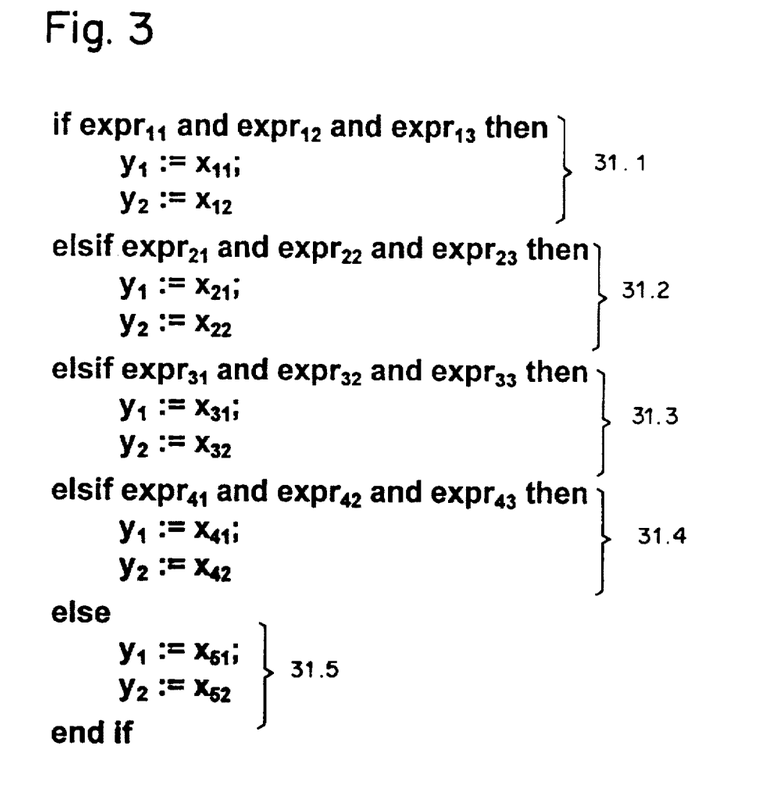
FIG. 3 shows a program code corresponding to the action of the decision table shown in FIG. 2.

The mode of operation of the decision table shown in FIG. 2 is represented in FIG. 3 in a linear notation in accordance with the programming language PORTAL which is similar to the PASCAL programming language (Arnold Businger: PORTAL Language Description, Lecture Notes in Computer Science 198, Springer Verlag Berlin Heidelberg N.Y. Tokyo 1985).

The sub-expressions $expr_{11}$ to $expr_{43}$ are Boolean data types and are therefore either of the value TRUE or FALSE. Firstly the first rule 31.1 is checked, for which purpose an expression formed from the logic AND-linking of the sub-expressions $expr_{11}$ and $expr_{12}$ and $expr_{13}$ is evaluated. It is only if said expression is of the value TRUE that the actions of the first rule 31.1 are executed, that is to say, it is only then that the value $X_{11}$ is generated at the first output channel $y_1$ and the value $X_{12}$ is generated at the second output channel $y_2$, but otherwise, that is to say that said expression is of the value FALSE, the second rule 31.2 is checked.

As in the case of nested qualified instructions of the PASCAL programming language, rules 31.1 and 31.2 and 31.3 and 31.4 are checked in accordance with the natural sequence—that is to say from left to right in accordance with the decision table shown in FIG. 2—until for the first time the expression of a rule is of the value TRUE whereupon the respective actions of the rule are performed. If the expression does not apply in the case of any of the rules 31.1 or 31.2 or 31.3 or 31.4 the actions of the last rule in the decision table, in this case therefore the actions of the fifth rule 31.5, are performed. The linear notation shown in FIG. 3 clearly expresses the point that a priority is fixedly attributed to the rules 31.1, 31.2, 31.3, 31.4 and 31.5 by virtue of the column position in the decision table (FIG. 2), the rule 31.1 therefore being evaluated with the highest priority, that is to say first.

An example of a decision table can advantageously be configured by way of an interactive user interface, in which case the number of input channels, the number of output channels and the number of rules is basically not restricted. Advantageously also physical addresses of the input channels and also physical addresses of the output channels are associated by way of the user interface and stored in the decision table in relation to the corresponding input and output channels respectively.

Figure 4:
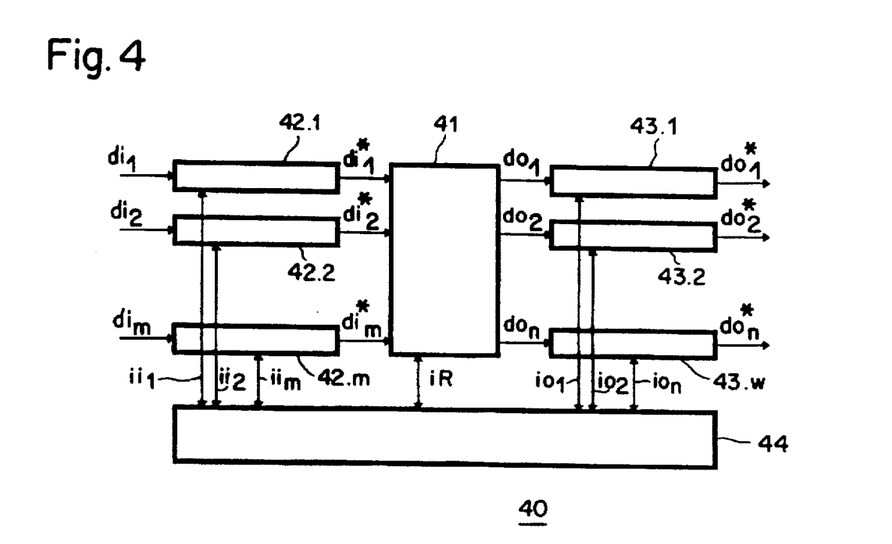
FIG. 4 is a diagram relating to the mode of operation of the decision table shown in FIG. 2.

FIG. 4 illustrates the principle of an advantageous embodiment 40 of the decision table in relation to the decision stage 1 or 2 respectively (FIG. 1), by means of a block diagram in which essential data flows are charted. A unit 41 includes rules by which actions of input channels 42.1 through 42.m on output channels 43.1 through 43.n are established. Associated with the decision table is a user interface 44 by way of which the rules of the unit 41 are inputted and the input channels 42.1 through 42.m and the output channels 43.1 through 43.n are configured. The user interface 44 advantageously includes means for visible representation of the rules, the current data of the input channels 42.1 through 42.m and the current data of the output channels 43.1 through 43.n in table form, as well as input means for inputting or altering the rules and the current data of the input channels 42.1 through 42.m or the output channels 43.1 through 43.n respectively.

The input channels 42.1 through 42.m are fed on the input side by input data flows $di_1$ through $di_m$ which are generated by associated sub-systems. On the output side the input channels 42.1 through 42.m make available to the unit 41 the input data flows $di_1$ through $di_m$ which are altered if required, in the form of input data flows $di*_1$ through $di*_m$. The input data flows $di*_1$ through $di*_m$ are transformed in accordance with the rules of the unit 41 into output data flows $do_1$ through $do_n$ of the output channels 43.1 through 43.n. The output channels 43.1 through 43.n transmit the output data flows $do_1$ through $do_n$, which are altered if required, to associated sub-systems, as output data flows $do*_1$ through $do*_n$.

The user interface 44 is connected to the input channels 42.1 through 42.m by way of interface data flows $ii_1$ through $ii_m$ and to the output channels 43.1 through 43.n by way of further interface data flows $io_1$ through $io_n$. In addition the user interface 44 is connected to the unit 41 by way of an additional interface data flow iR. By means of the interface data flows iR, $ii_1$ through $ii_m$ and $io_1$ through $io_n$, on the one hand the decision table can be configured in accordance with the presetting values of a user while on the other hand the current data of the decision table can be represented by the user interface 44. Advantageously also the rules of the unit 41 can be varied by way of the user interface.

The current data of the input channels 42.1 through 42.m and the output channels 43.1 through 43.n are advantageously also variable, for example for test purposes, by means of the user interface 44 by way of the interface data flows $ii_1$ through $ii_m$ and $io_1$ through $io_n$.

Figure 5:
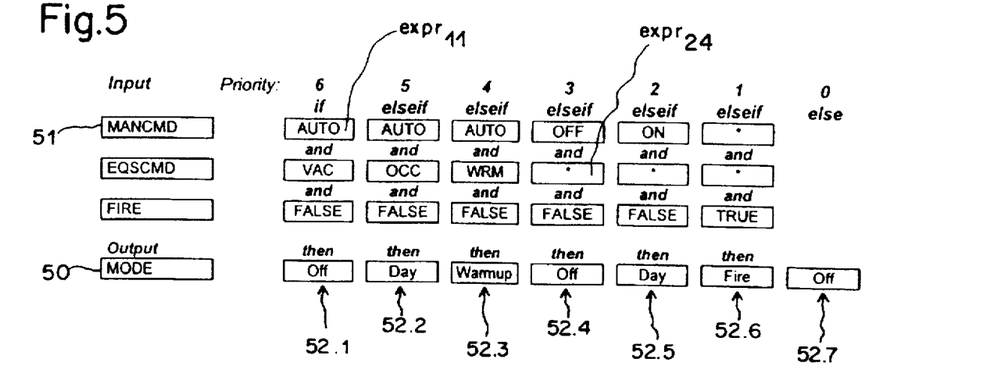
FIG. 5 shows a decision table for the selection of an operating state.

FIG. 5 shows by way of example a decision table for the selection of an operating state identified here by MODE on the basis of state values of input channels identified by MANCMD, EQSCMD or FIRE. The decision table for selection of the operating state is a practical embodiment of the principle of the first decision stage 1 (FIG. 1) and therefore typically has only a single output channel MODE but a plurality of input channels.

If required however the data type of a data unit 50 which is available at a given moment in time by way of the output channel MODE is a structured data type, for example in accordance with the programming language C++ a so-called structure "struct { }" or in accordance with the programming language PASCAL a so-called "Record" or a so-called variant. Thus, with the current operating state of a heating installation, for example a reference value is also generated for a room temperature and the operating state and the reference value are made available jointly as a structure by the single output channel MODE.

Representation of sub-expressions of the rules are here reduced to scalar constants so as to provide a complete sub-expression about a comparison with the input channel which is operative as a variable. As an example in that respect mention may be made of the first Boolean sub-expression $expr_{11}$ of the first rule which is more completely a comparison "MANCMD=AUTO", wherein MANCMD denotes the input channel, which is tantamount to the name of a channel variable 51.

The decision table shown in FIG. 5 has seven rules 52.1 through 52.7 or table columns 52.1 through 52.7, wherein a rule 52.r is represented in accordance with the manner described in FIG. 2, in the table column 52.r.

A rule represented in a table column 52.1 is processed with highest priority by the logic AND-linking of the Boolean sub-expressions of the rule, in this case therefore "MANCMD=AUTO" AND "EQSCMD=VAC" AND "FIRE=FALSE" being evaluated. If the logic AND-linking of the Boolean sub-expressions gives the value TRUE, the value "Off" is allocated to the output channel MODE, but otherwise the rule is processed with the next lower priority.

Here a constant of a sub-expression $expr_{24}$, which is identified by the character "*", means that the Boolean sub-expression "EQSCMD=*" gives the value TRUE for all values of the input channel EQSCMD.

Figure 6:
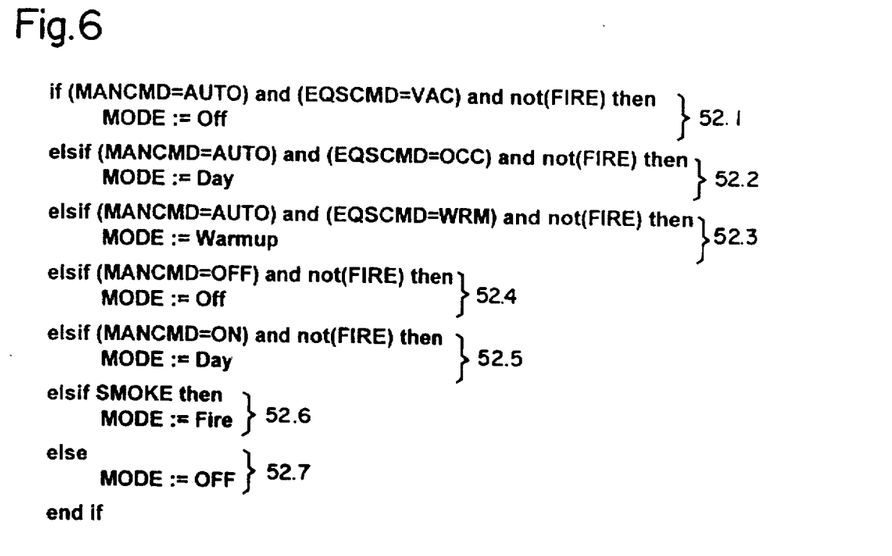
FIG. 6 shows the program code corresponding to the action of the decision table shown in FIG. 5.

FIG. 6 shows the mode of operation of the decision table illustrated in FIG. 5, in the linear notation of the PORTAL programming language, wherein a respective table column 52.r or rule 52.r corresponds to a nested IF-THEN instruction.

By virtue of the fact that a name in principle can be freely selected and represented by way of the user interface 44 (FIG. 4) in the decision table for input channels and output channels and for constants, the decision table is an essential means for transparent and reliable guidance for example of an installation operator. The decision table of the first decision stage 1 permits a clear and unitary representation of the rules used for selection of the operating state. The sub-systems 3, 4 and 5 respectively connected to the input channels 11, 12 and 13 may have different state spaces; even if said sub-systems 3, 4 and 5 have different amounts of states and if the states of the sub-systems 3, 4 and 5 respectively are named differently, the decision table permits a clear and open representation of the bases of decision of the decision stage 1 on the basis of the rules illustrated in table columns 52.

Figure 7:
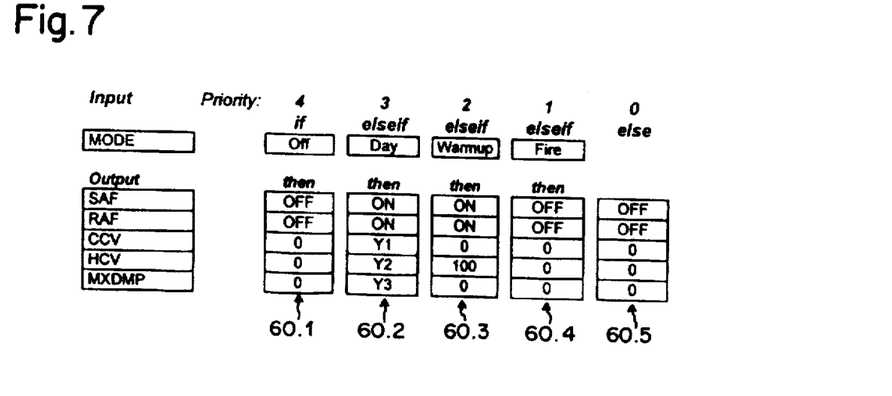
FIG. 7 shows a decision table for actuation of parts of the installation.

FIG. 7 shows by way of example a decision table for the actuation of parts of an installation or sub-systems in dependence on an input channel which is identified here by MODE.

The decision table for actuation of sub-systems is a practical embodiment of the principle of the second decision stage 2 (FIG. 1) and therefore typically has only a single input channel identified here by MODE but a plurality of output channels which are here identified by SAF, RAF, CCV, HCV and MXDMP.

The decision table shown in FIG. 7 has five rules 60.1 through 60.5 or table columns 60.1 through 60.5, wherein a rule 60.r is represented in accordance with the manner described in FIG. 2 in the table column 60.r.

A rule represented in a table column 60.1 is processed with the highest priority by the Boolean expression of the rule, here therefore "MODE=Off" being evaluated. If the Boolean expression gives the value TRUE the value "Off" is attributed to the output channel SAF and the output channel RAF respectively and in addition the value zero is attributed to the output channel CCV and the output channel HCV as well as the output channel MXDMP respectively, while otherwise the rule is processed with the next lower priority.

Figure 8:
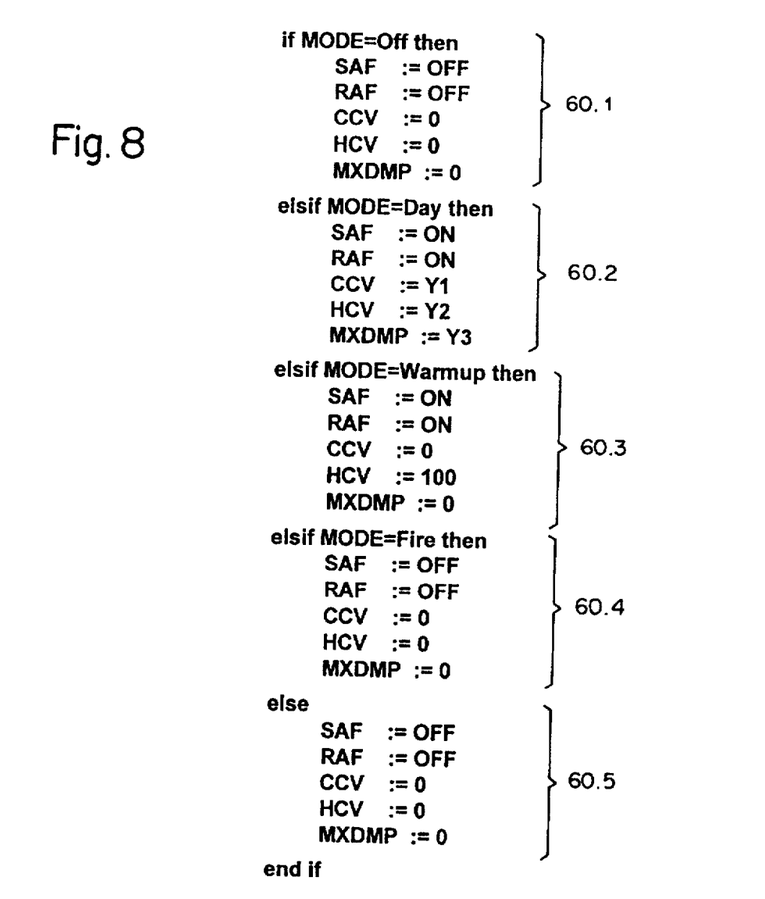
FIG. 8 shows the program code corresponding to the action of the decision table shown in FIG. 7.

FIG. 8 shows the mode of operation of the decision table illustrated in FIG. 7 in the linear notation of the PORTAL programming language, wherein a respective table column 60.r or rule 60.r corresponds to a nested IF-THEN instruction.

Figure 9:
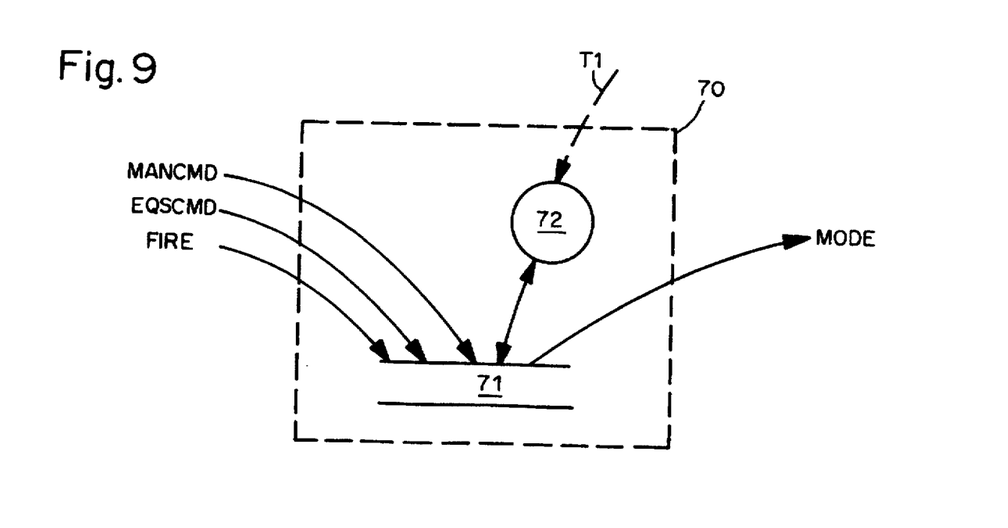
FIG. 9 shows a data flow chart with the decision table shown in FIG. 5.

In FIG. 9 reference 70 denotes the decision table for selection of the operating state here identified by MODE on the basis of state values of the input channels identified by MANCMD, EQSCMD or FIRE. The decision table 70 has a data memory 71 for storage of the associated rules and for storage of current values of the input channels MANCMD, EQSCMD and FIRE and of the output channel MODE. Associated with the decision table 70 is a process 72 which, on the basis of the rules, calculates the state value of the output channel MODE from the current values of the input channels MANCMD, EQSCMD and FIRE. Advantageously the process 72 is started by a trigger signal T1 which is generated for example by a regulating device. In a first variant of the process 72 the trigger 71 is triggered off automatically, for example periodically. In a second variant of the process 72 the trigger signal T1 is triggered off by a certain change in a value of one of the input channels MANCMD, EQSCMD or FIRE.

Figure 10:
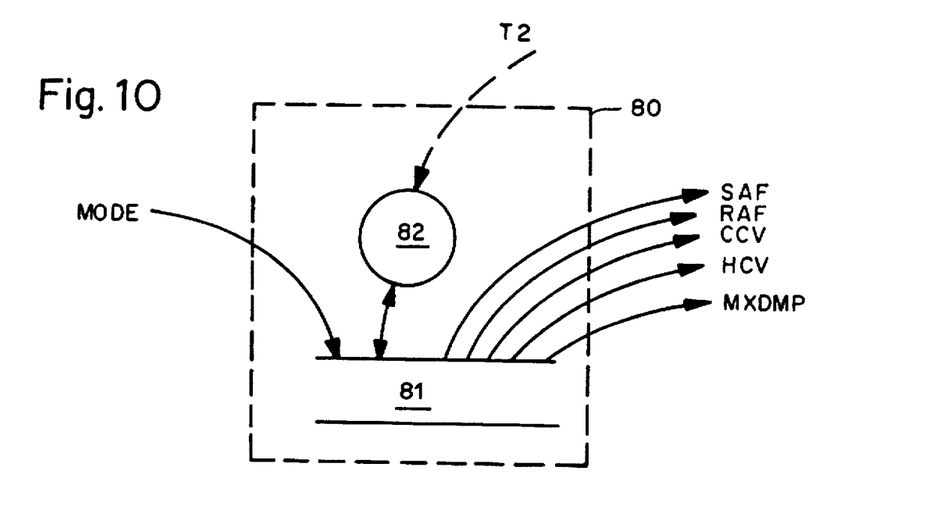
FIG. 10 shows a data flow chart with the decision table shown in FIG. 7.

In FIG. 10 reference 80 denotes the decision table for actuation of parts of an installation or sub-systems in dependence on an input channel which is identified here by MODE. The decision table 80 has a data memory 81 for storage of the associated rules and for storage of current values of the input channel MODE and the output channels which are identified here by SAF, RAF, CCV, HCV or MXDMP. Associated with the decision table 80 is a process 82 which, on the basis of the rules, calculates from the current state value of the input channel MODE, the corresponding values of the output channels SAF, RAF, CCV, HCV and MXDMP. Advantageously the process 82 is started by a trigger signal T2 which is generated for example by a regulating device. In a first variant of the process 82 the trigger signal T2 is triggered off automatically, for example periodically. In a second variant of the process 82 the trigger signal T2 is triggered off by a change in the value of the input channel MODE.

Figure 11:
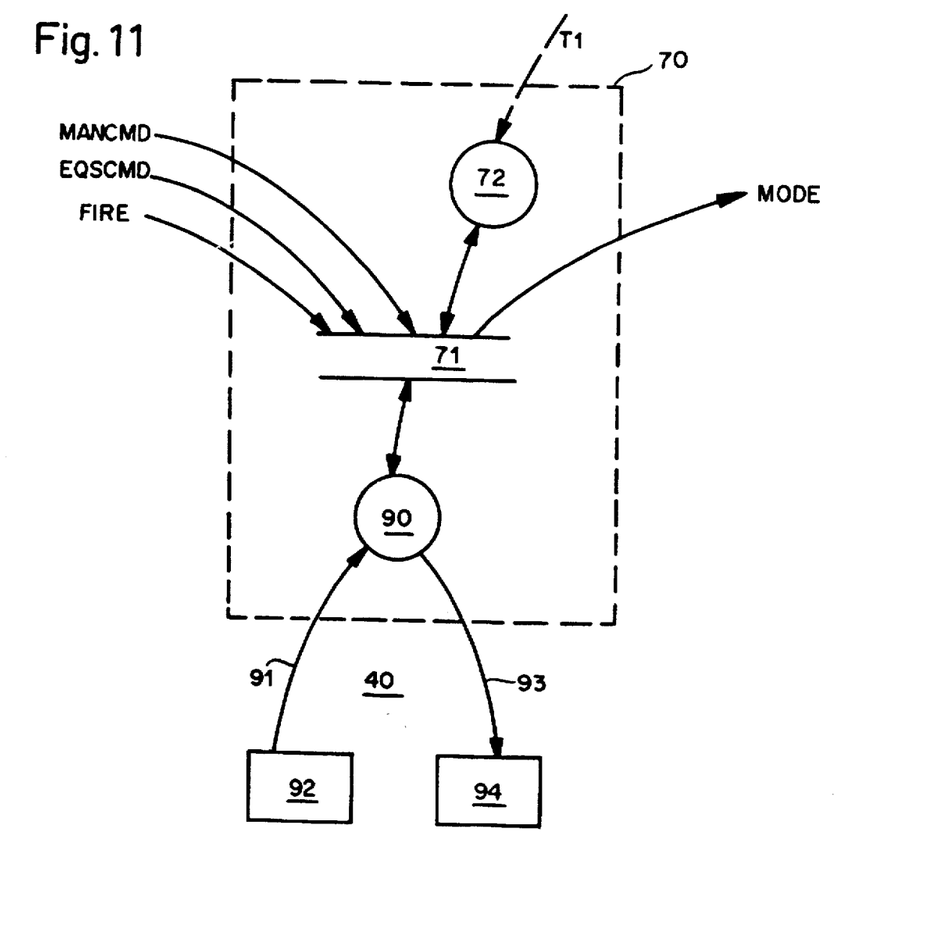
FIG. 11 shows a data flow chart of a decision stage.

The user interface 44 (FIG. 4) of the decision table 70 for selection of the operating state identified here by MODE advantageously has an input/output process identified by 90 in FIG. 11. The input/output process 90 is connected by way of an input channel 91 to an input device 92 and by way of an output channel 93 to an output device 94. The output device 94 is for example a picture screen for representing a graphic operating view of the decision table 70 and further images and data of a building management system. Data for configuration and alteration of the decision table 70 are inputted by way of the input device 92. The input device 92 advantageously permits call-ups for representing widely different operating view of the building management system which also includes the decision table 70. The input device 92 is for example a combination with a keyboard and a mouse or another input device which can be coupled to an optical marking—a so-called cursor—of the output device 94.

Figure 12:
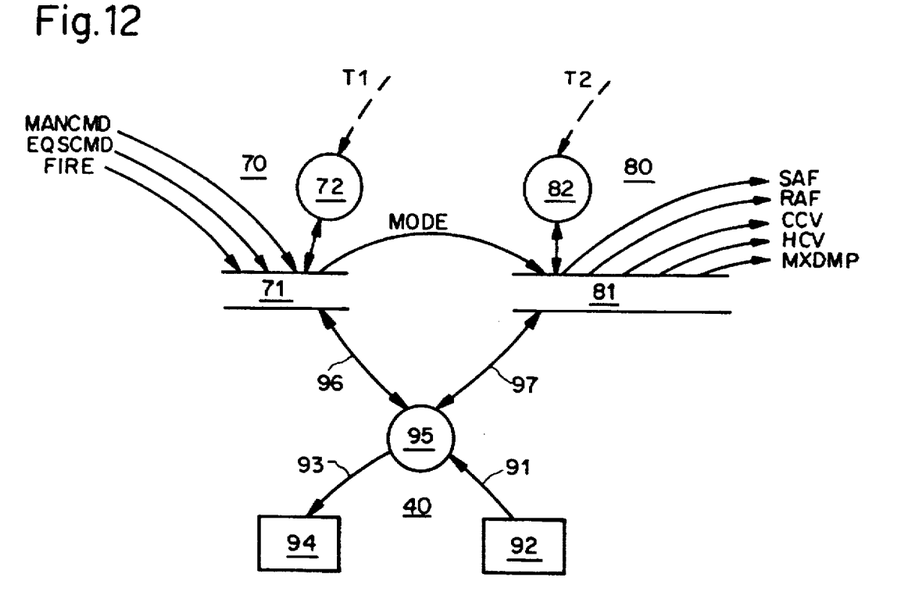
FIG. 12 shows a data flow chart with two decision stages.

In FIG. 12 a variant 95 of the input/output process 90 (FIG. 11) is connected by way of a first data channel 96 to the data memory 71 of the first decision table 70 which serves for selection of the operating state and by way of a second data channel 97 to the data memory 81 of the second decision table 80 which serves for actuation of parts of the installation or sub-systems. The two decision tables are coupled together insofar as the output channel, identified by MODE, of the first decision table 70 or the first decision stage 1 (FIG. 1) is connected to the input channel, also identified by MODE, of the second decision table 80.

The high degree of clarity which can be achieved and the resulting reliability of the decision stage 1 and 2 respectively embodied by means of the decision table can be used to particular advantage in a relatively large system, for example in a building management system, insofar as further decision stages which are embodied by decision tables of the same kind are linked in a simple fashion, wherein a respective output channel of a decision stage is connected to an input channel of a further decision stage. In that way, a high degree of user-friendliness can also be achieved in the entire system, besides a high level of reliability.

Interlinking of decision tables has a particularly advantageous effect insofar as decision processes which are difficult to analyse, with a plurality of input parameters and an plurality of output parameters, can be divided into a selection process which can be relatively easily controlled and an easily controllable distribution process which follows the selection process, wherein in principle a plurality of combinations each including a respective selection process and a respective distribution process can be connected in succession and the selection processes and the distribution processes are advantageously embodied by decision tables.

Figure 13:
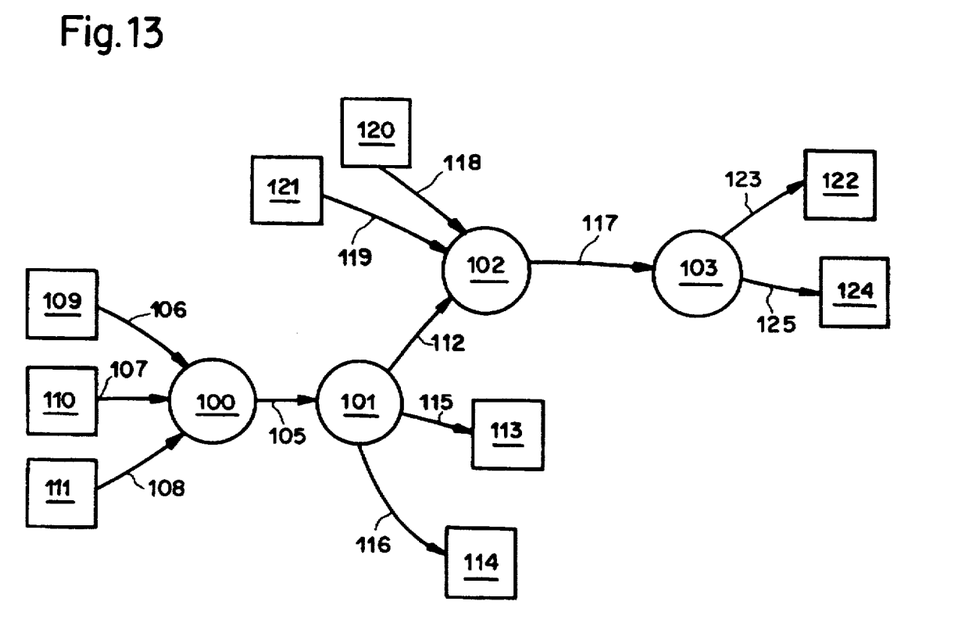
FIG. 13 shows a data flow chart of an installation with a plurality of interlinked decision stages or decision tables.

In FIG. 13 reference 100 denotes a first selection process, 101 denotes a first distribution process, 102 denotes a second selection process and 103 denotes a second distribution process. The first selection process 100 generates a first state signal 105 in dependence on signals 106, 107 and 108 which are fed to the first selection process 100 from parts 109, 110 and 111 of the installation. On the basis of the first state signal 105 which is fed to the first distribution process 101, generated in the first distribution process 101 are a signal 112 which is fed to the second selection process and a signal 115 and 116 respectively which are fed to installation parts 113 and 114 respectively. The second selection process 102 generates a second state signal 117 in dependence on the signal 112 generated by the first distribution process 101 and in dependence on the signals 118 and 119 which are supplied by further installation parts 120 and 121 to the second selection process 102. Finally the second distribution process 103 generates a signal 123 which is fed to an installation part 122 and a further signal 125 which is fed to an installation part 124.

The decision tables of the decision stages 1 and 2 and the decision tables of the selection and distribution processes 100, 101, 102 and 103 are particularly advantageously embodied by object-oriented program systems and are written for example by means of the programming language C++ (Bjarne Stroustroup: Die C++ programmiersprache, Addison-Wesley, 1985) or with another object-oriented programming language and produced with a suitable tool in known manner.

Figure 14:
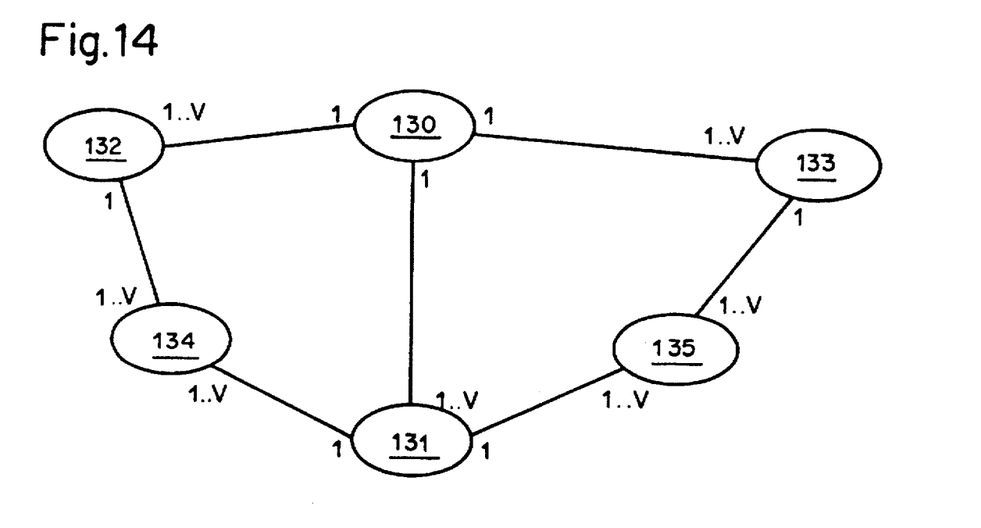
FIG. 14 shows classes of a decision stage and the relationships thereof.

In FIG. 14 an advantageous object-oriented implementation of the decision stage 1 or 2 (FIG. 1) has a class 130 for decision tables, a class 131 for rules 31.1 through 31.5 (FIG. 2), a class 132 for input channels 11, 12 and 13 (FIG. 1), a class 133 for output channels 14, 15, 16, 17 and 18, a class 134 for sub-expressions $\text{expr}_{r,k}$ (FIG. 2) and conditions and a class 135 for actions $X_{r,k}$ (FIG. 2).

Relationships between each two classes are represented by a line in accordance with the manner known from entity-relationship diagrams. In that respect an expression "1 ... V" denotes a multiple relationship between instances of two classes, wherein however there is at least one relationship and the number of relationships is in principle not limited.

An instance of the class 130 for decision tables is therefore linked at least with an instance of the class 132 for input channels and further with at least one instance of the class 133 for output channels and with at least one instance of the class 131 for rules. An instance of the class 131 for rules is linked at least to an instance of the class 134 for sub-expressions $expr_{rk}$ or conditions and at least one instance of the class 135 for actions. In addition an instance of the class 134 for sub-expressions $expr_{rk}$ or conditions is precisely linked to an instance of the class 132 for input channels while and instance of the class 135 for actions is precisely linked to an instance of the class 133 for output channels.

By virtue of the fact that the decision stage 1 or 2 (FIG. 1) or the selection or distribution processes 100, 101, 102 or 103 (FIG. 13) is embodied by a decision table which is advantageously designed as shown in FIG. 2, it is possible at low cost to program different operating views of the decision stages 1 or 2 or the selection or distribution processes 100, 101, 102 or 103 which are precisely matched to the requirements of a certain user category.

In general there are provided a plurality of different user categories which advantageously have different access rights to the decision tables and for which the data required for their needs are available in a predefined operating view. Advantageously however an operating view is always in a table form. It is self-evident that operating views of the decision table can be adapted at low cost to the language of the user category for which the operating views are intended.

An operating view for engineering tasks advantageously represents all rules 31.1 through 31.5 while an operating view for general monitoring tasks advantageously only represents a single rule, namely the rule 31.r which is applicable at the time of consideration and whose sub-expressions $expr_{rk}$ are all true at the time of consideration.

An operating view of the advantageously implemented decision stage 1 or 2 can be programmed at low cost in particular when implementation of the user interface is effected by employing an operating system which—such as for example the system "Windows NT"—supports a representation of so-called windows on the picture screen.

Figure 15:
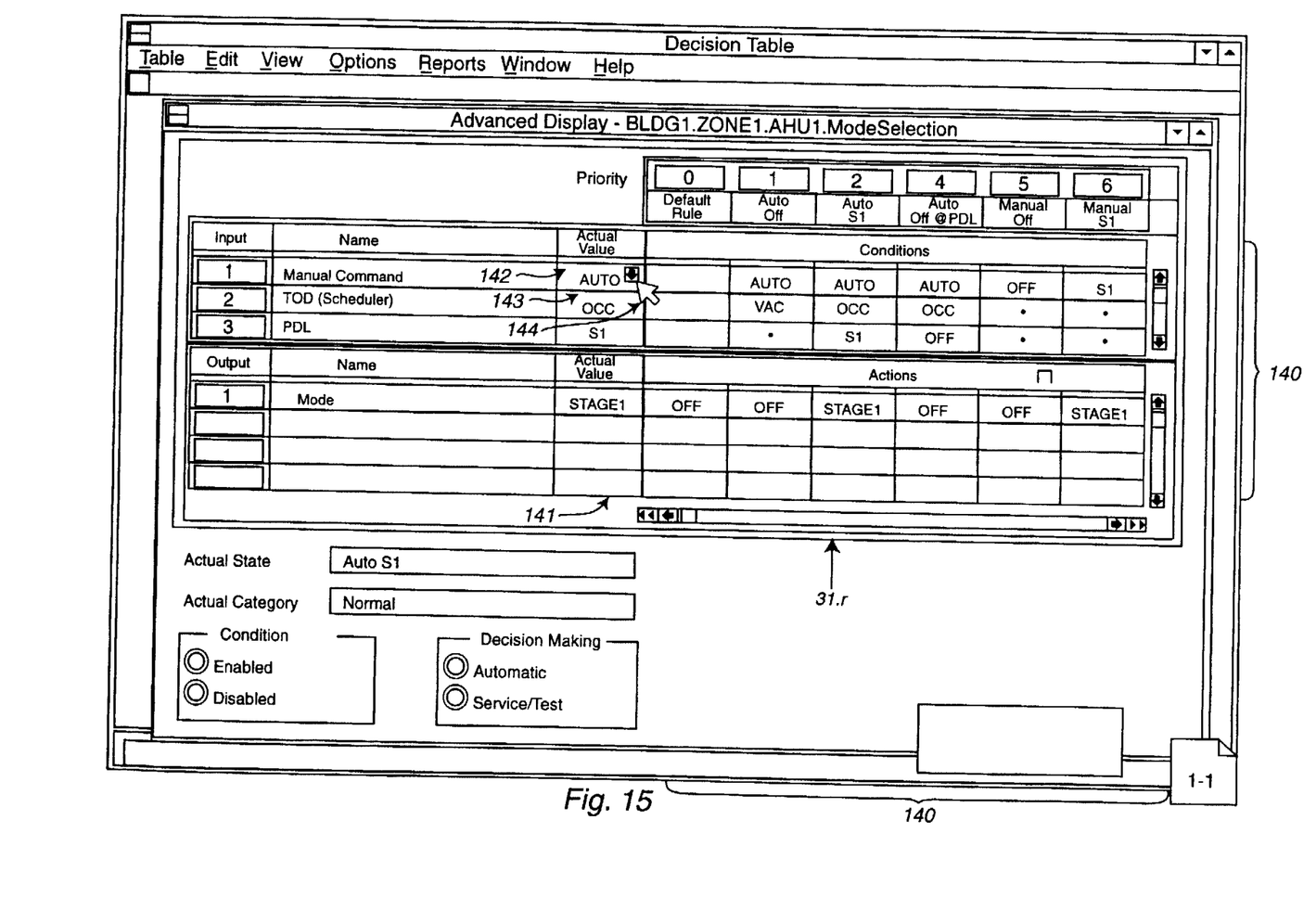
FIG. 15 shows an operating view (window) for a first decision stage.
Figure 16:
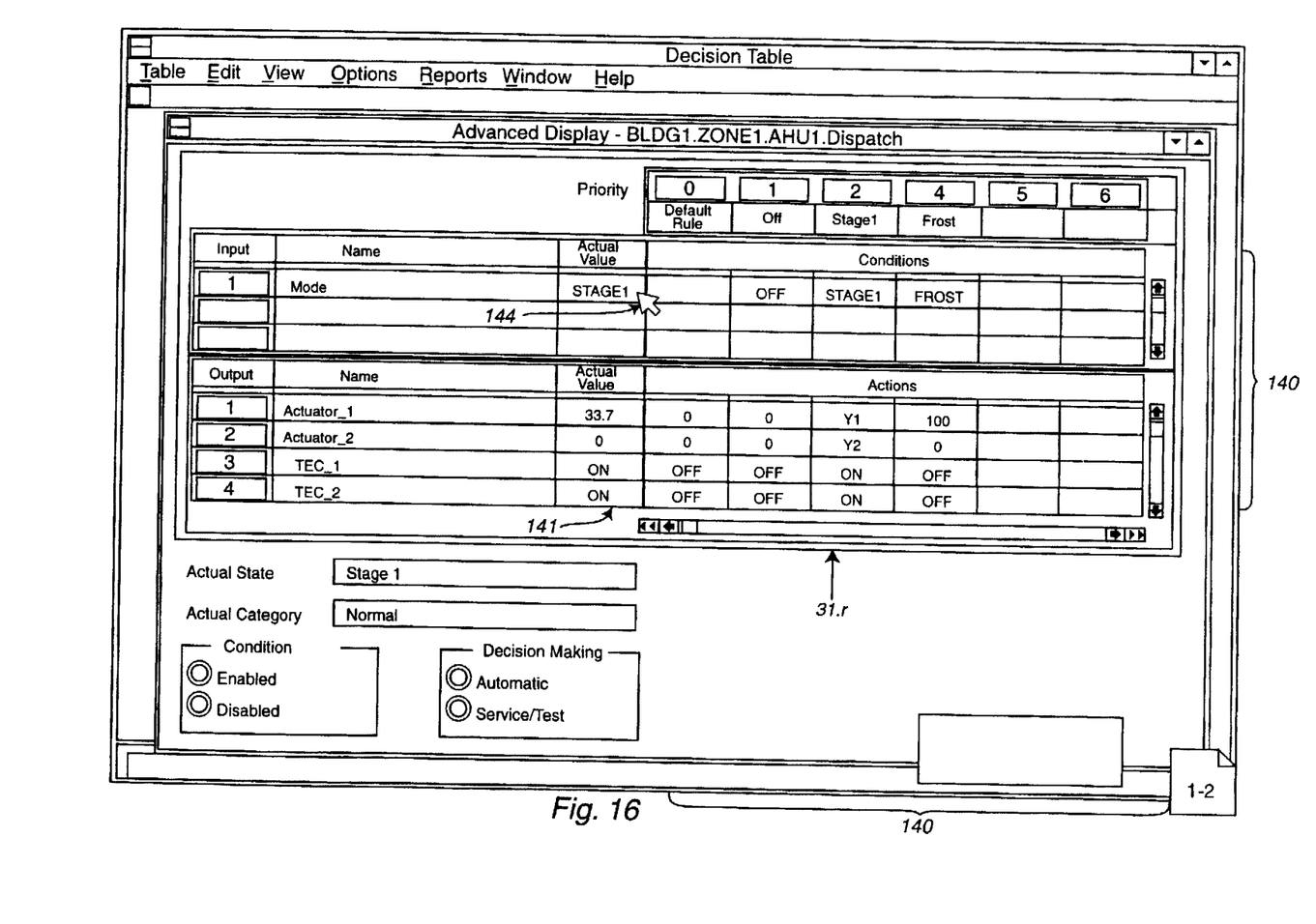
FIG. 16 shows an operating view (window) for a second decision stage.

In FIG. 15 and FIG. 16, reference 140 denotes a window area with the rules having actions and conditions of the decision table of the first decision stage 1 and the second decision stage 2 respectively. The currently applicable rule 31.r is advantageously optically identified in the window area 140. The current values of the input channels and the output channels are represented in a column 141.

Optical identification of the currently applicable rule 31.r is effected for example by means of coloring of the respective column of the window area 140 in which the currently applicable rule 31.r is represented.

In accordance with the representation shown in FIG. 15 the following Boolean expression is evidently true:

(Manual Command=AUTO) AND (TOD=OCC) AND (PDL=S1)

whereby the action Mode:=STAGE 1 is performed.

A current value AUTO of an area 142 (FIG. 15) which is provided for representation of the current value of an input channel 11 (FIG. 1) can be altered in an advantageous manner—for example for test purposes—by a means 143 for altering a table entry. The means 143 for altering a table entry can be selected for example by way of a light mark 144 coupled to a mouse and in principle is advantageously arranged wherever an alteration is allowed in the operating view.

An advantageous method of controlling and/or regulating process parameters of an installation with at least four sub-systems 3, 4, 5, 6, 7, 8 or 9 (FIG. 1) of which at least two sub-systems 3, 4 or 5 each have a respective state which can be represented by a signal of the sub-system and of which at least two further sub-systems 6, 7, 8 or 9 each have a respective state which is variable by way of a signal which can be fed to the respective sub-system advantageously involves at least the following three method steps:

A first method step in which, by evaluation of rules of a first decision table associated with the decision stage 1, on the basis of the state of a first sub-system 3 or on the basis of the state of a second sub-system 4 or 5 respectively, a further state value Z is ascertained.

A further method step in which the state value Z ascertained in the first method step is fed to the input 14 of a second decision table associated with the decision stage 2.

Finally a third method step in which evaluation of rules of the second decision table produces an alteration in the state of a third sub-system 6 or 7 or the state of a fourth sub-system 8 or 9 respectively.

By virtue of the advantageous method it is possible to provide for conflict-free coordination of a state of the installation which is given by states of the sub-systems 3, 4, 5, wherein the rules applied for coordination purposes can be clearly seen on the part of an installation operator in operating views of the decision tables associated with the decision stages 1 and 2.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for controlling and/or regulating process parameters of an installation, comprising:
   means for graphic representation of data, commands and images,
   means for input and alteration of data,
   means for storage of data,
   a decision table comprising a plurality of rules, said rules being associated with predetermined priorities which is unique in said decision table and which is established by positions of said rules in said decision table,
   means for evaluation of said rules, wherein a sequence observed in evaluation of said rules is determined by said priorities associated with said rules, a rule having the highest priority being evaluated first, and at least one of said rules includes a condition and an action, said action being executed only when said condition of said at least one of said rules is fulfilled,
   wherein said decision table is stored and graphically displays said positions priorities, condition and action of said rules so that a state of the installation, and the process parameter causing said state, is recognized by an operator,
   said apparatus further comprising at least one input channel having a value which is compared by said condition to a further value, and
   at least one output channel having a value which is altered by said action when executed.

2. Apparatus according to claim 1 wherein said decision table includes a first decision table having a first output channel and a second decision table having a second input channel, said first output channel of said first decision table being coupled to said second input channel of said second decision table.

3. Apparatus according to claim 2 wherein said installation has at least two first sub-systems each having a state value, said first decision table having respective first input channels connected to said first sub-systems in such a way that said state value of a said first sub-system is fed to said first decision table, and wherein, by evaluation of said rules of said first decision table, a certain state Z is ascertained, said state Z being transmitted by way of said first output channel of the first decision table to said second decision table.

4. Apparatus according to claim 3 wherein said installation further includes a plurality of second sub-systems and wherein said second decision table has at least two second output channels connected to respective said second sub-systems, and wherein, by evaluation of said rules of said second decision table on the basis of said state Z supplied by way of said second input channel of said second decision table, a signal is generated for transmission via said second output channel of said second decision table to said second sub-system connected thereto.

5. Apparatus according to claim 1 wherein said decision table is generated by said means for input and alteration of data.

6. Apparatus according to claim 1 wherein said decision table includes values which are variable by said means for the input and alteration of data.

7. Apparatus according to claim 1 wherein two interconnected decision tables can be simultaneously represented in a single operating view.

8. Apparatus according to claim 1 wherein said installation is a building automation installation.

9. A method of controlling and/or regulating process parameters of an installation having at least four sub-systems of which at least two first sub-systems each have a respective state which is represented by a signal generated by the first sub-systems, and of which two second sub-systems each have a state which is variable by means of a signal supplied to the respective second sub-systems, the method comprising:

a first method step in which, by evaluation of rules of a first decision table on the basis of a state of at least one of said at least two first sub-systems, a state value Z is ascertained, a second method step in which said state value Z ascertained in the first method step is fed to an input of a second decision table, and a third method step in which, by evaluation of rules of the second decision table, a state of at least one of said two second sub-systems is altered, wherein said first and second decision tables graphically display said rules, and positions, priorities, conditions and actions of said respective rules so that a state of the installation and the process parameter causing said state is recognized by an operator.

\* \* \* \* \*